United States Patent
Imai

(10) Patent No.: US 12,267,670 B2
(45) Date of Patent: Apr. 1, 2025

(54) NETWORK DEVICE, METHOD, AND RECORDING MEDIUM

(71) Applicant: CANON KABUSHIKI KAISHA, Tokyo (JP)

(72) Inventor: Tetsu Imai, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 527 days.

(21) Appl. No.: 17/474,152

(22) Filed: Sep. 14, 2021

(65) Prior Publication Data
US 2022/0109984 A1    Apr. 7, 2022

(30) Foreign Application Priority Data
Oct. 1, 2020   (JP) ................ 2020-167356

(51) Int. Cl.
*H04W 12/03*   (2021.01)
*H04L 41/22*   (2022.01)
*H04L 41/28*   (2022.01)

(52) U.S. Cl.
CPC ........... *H04W 12/03* (2021.01); *H04L 41/22* (2013.01); *H04L 41/28* (2013.01)

(58) Field of Classification Search
None
See application file for complete search history.

(56) References Cited

U.S. PATENT DOCUMENTS

| | | | |
|---|---|---|---|
| 6,687,497 B1 * | 2/2004 | Parvulescu | H04M 1/72463 455/418 |
| 8,473,251 B1 * | 6/2013 | Noth | G06F 11/079 702/183 |

(Continued)

FOREIGN PATENT DOCUMENTS

| | | |
|---|---|---|
| JP | 2006-005847 A | 1/2006 |
| JP | 2007-122429 A | 5/2007 |

(Continued)

OTHER PUBLICATIONS

Japanese Office Action dated Jul. 9, 2024, in related Japanese Patent Application No. 2020-167356.

*Primary Examiner* — Michael W Chao
(74) *Attorney, Agent, or Firm* — VENABLE LLP

(57) ABSTRACT

A network device includes at least one memory storing instructions, and one or more processors configured to execute the instructions, which when executed by the one or more processors, cause the network device to output information indicating occurrence of a specific event in the network device to a predetermined display region, check approval or disapproval of transmission of information regarding the specific event to a management server in accordance with selection of the predetermined display region, enable mobile communication if transmission of the information regarding the specific event to the management server is approved, and transmit the information regarding the specific event to the management server through the enabled mobile communication, wherein the mobile communication enables communication between the network device and the management server via a WAN, and wherein, if the mobile communication is not enabled, the network device does not connect to the WAN.

13 Claims, 14 Drawing Sheets

(56) References Cited

U.S. PATENT DOCUMENTS

| | | | |
|---|---|---|---|
| 8,948,790 B1* | 2/2015 | Kim | H04W 4/48 455/411 |
| 9,948,751 B2 | 4/2018 | Tsuchida et al. | |
| 10,042,301 B1 | 8/2018 | Mimura | |
| 10,051,103 B1* | 8/2018 | Gordon | G06F 9/451 |
| 10,234,804 B2 | 3/2019 | Mimura | |
| 10,405,261 B1* | 9/2019 | Patel | H04B 17/318 |
| 10,645,239 B2 | 5/2020 | Kanematsu | |
| 10,735,937 B2 | 8/2020 | Shiihara | |
| 10,970,005 B2 | 4/2021 | Saito | |
| 11,163,632 B2 | 11/2021 | Sekiguchi et al. | |
| 11,188,407 B1* | 11/2021 | Swanson | G06F 11/1435 |
| 11,487,481 B2 | 11/2022 | Saito | |
| 2003/0208593 A1* | 11/2003 | Bharati | G06F 11/079 709/224 |
| 2005/0019077 A1* | 1/2005 | Hatta | H04N 1/00172 400/62 |
| 2005/0117948 A1* | 6/2005 | Hatta | H04N 1/603 400/62 |
| 2005/0138111 A1* | 6/2005 | Aton | G06F 11/3476 709/201 |
| 2005/0238046 A1* | 10/2005 | Hassan | H04L 12/5692 370/465 |
| 2006/0136784 A1* | 6/2006 | Prescott | G06F 11/0781 714/38.11 |
| 2007/0214396 A1* | 9/2007 | McKeogh | G06F 11/0793 714/57 |
| 2007/0266271 A1* | 11/2007 | Frints | G11B 20/18 |
| 2008/0045200 A1* | 2/2008 | Skinner | H04M 1/72463 455/418 |
| 2008/0238794 A1* | 10/2008 | Pan | H01Q 9/145 343/767 |
| 2008/0320343 A1* | 12/2008 | Eickmeyer | G06F 11/3676 714/57 |
| 2009/0061781 A1* | 3/2009 | Zhang | H04W 52/0258 455/66.1 |
| 2010/0083036 A1* | 4/2010 | Calinoiu | G06F 11/366 714/2 |
| 2011/0015856 A1* | 1/2011 | Arnold | G01C 21/3611 704/E13.011 |
| 2011/0099272 A1* | 4/2011 | Takahashi | G06F 11/0733 709/224 |
| 2011/0205986 A1* | 8/2011 | Medapalli | H04W 72/0446 370/329 |
| 2012/0064855 A1* | 3/2012 | Mendelson | G01S 1/68 455/404.1 |
| 2012/0129564 A1* | 5/2012 | De La Cropte De Chanterac | H04W 52/0251 455/522 |
| 2012/0190326 A1* | 7/2012 | Mizusawa | H04L 12/1489 455/406 |
| 2013/0063763 A1* | 3/2013 | Tse | H04N 1/00127 358/1.15 |
| 2013/0086284 A1* | 4/2013 | Shaver | G06F 1/3287 710/18 |
| 2013/0244608 A1* | 9/2013 | Malik | H04W 4/90 455/404.1 |
| 2013/0295904 A1* | 11/2013 | Putman | H04W 52/0274 455/418 |
| 2014/0075244 A1* | 3/2014 | Takahashi | G06F 11/0736 714/38.1 |
| 2014/0106699 A1* | 4/2014 | Chitre | H04W 76/25 455/404.1 |
| 2014/0162595 A1* | 6/2014 | Raleigh | H04W 8/18 455/405 |
| 2014/0258480 A1* | 9/2014 | Tungatkar | H04W 12/08 709/221 |
| 2017/0017766 A1* | 1/2017 | Giraud | G16H 40/67 |
| 2018/0234828 A1* | 8/2018 | Shiihara | H04W 8/265 |
| 2019/0124559 A1* | 4/2019 | Brown | H04W 48/06 |
| 2019/0182734 A1* | 6/2019 | Laliberte | H04L 65/10 |
| 2020/0015034 A1* | 1/2020 | Ahn | H04W 60/04 |
| 2020/0107255 A1* | 4/2020 | Cuevas Ramirez | H04W 88/06 |
| 2020/0107264 A1* | 4/2020 | Ayoub | H04W 4/80 |
| 2020/0228621 A1* | 7/2020 | Gamroth | H04W 4/33 |
| 2021/0243695 A1* | 8/2021 | Korrapati | H04W 52/0274 |

FOREIGN PATENT DOCUMENTS

| | | |
|---|---|---|
| JP | 2015-035163 A | 2/2015 |
| JP | 2018-045269 A | 3/2018 |
| JP | 2018-128530 A | 8/2018 |
| JP | 2018-133001 A | 8/2018 |
| JP | 2019-004386 A | 1/2019 |
| JP | 2019-144879 A | 8/2019 |
| WO | 2019/026519 A | 2/2019 |

* cited by examiner

FIG. 10C

Information

Transmitted information:
   Error code: ERR0001
   Failure location: Drum A

The above information has been transmitted.

[ Yes ]

FIG. 10D

Information

Information to be transmitted:
   Error code: ERR0001
   Failure location: Drum A Company bears cloud connection for transmission of above information. Internet connection in this contract of customer is not used.

Will above information be transmitted?

[ Yes ]   [ No ]

FIG. 10E

```
Information
┌─────────────────────────────────────────┐
│ This device will transmit following information to │
│ cloud via sim.                          │
│   · Failure information                 │
│   · Consumables information             │
│                                         │
│ Will above information be transmitted?  │
│                                         │
│      [ Yes ]         [ No ]             │
└─────────────────────────────────────────┘
```

NETWORK DEVICE, METHOD, AND RECORDING MEDIUM

BACKGROUND OF THE INVENTION

Field of the Invention

The present invention relates to a network device, a method, and a program.

Description of the Related Art

A technique has been proposed in which a device for inserting a subscriber identity module (SIM) card into a network device for communication is attached, and communication dedicated to IoT and service support is directly performed without using a backbone network or the like. Japanese Patent Laid-Open No. 2018-133001 discloses a management device that transmits operation information of a network device to a device management system through mobile communication using a SIM.

Mobile communication dedicated to service support is used by using a SIM, and thus it is possible to disconnect a network device from a network at normal times for security reasons and to transmit information regarding an event through the mobile communication only when an event such as a failure occurs. However, even with mobile communication dedicated to service support, there is a need for a structure that allows a customer to check approval or disapproval of transmitting information regarding an event that has occurred in a network device to a service (management server).

SUMMARY OF THE INVENTION

The present invention makes it possible to transmit information regarding a specific event in a network device to a management server through mobile communication after checking approval or disapproval of transmitting the information to the management server. This provides a sense of security to a service customer.

According to an embodiment of the present invention, there is provided a network device including an output unit configured to output information regarding a specific event in the network device to a predetermined display region; a check unit configured to check approval or disapproval of transmission of information regarding the specific event to a management server in accordance with selection of the predetermined display region; a control unit configured to validate mobile communication if transmission of the information regarding the specific event to the management server is approved; and a transmission unit configured to transmit the information regarding the specific event to the management server through the mobile communication.

Further features of the present invention will become apparent from the following description of exemplary embodiments with reference to the attached drawings.

BRIEF DESCRIPTION OF THE DRAWINGS

FIGS. 10A to 10E are diagrams illustrating examples of screens displayed on the image processing device.

DESCRIPTION OF THE EMBODIMENTS

Example 1

Hereinafter, the present embodiment will be described with reference to the drawings. The present invention is applicable to, for example, an information processing system including a data management server and an image processing device that has a function of notifying the data management server of information (for example, fault information) regarding an event through mobile communication when the event occurs. When a fault occurs as an event in the image processing device, the image processing device validates mobile communication and notifies the data management server of fault information. A fault occurring in the image processing device is, for example, an error or a component failure of which the occurrence has been detected inside the image processing device, and a specific example thereof is a drum failure. Hereinafter, an example of providing a notification of fault information (fault notification) if a drum failure occurs will be described.

---

(Fault notification at time of drum failure)

```
{
    "DeviceId": "DEV00001",
    "SerialNo. ": "SER00001",
    "ErrorCode": "ERR0001",
    "Parts": "Drum",
        "Unit1Counter": 6127,
    "Unit2Counter": 594,
    "Unit3Counter": 22,
        "ContractDate": "2020/4/1"
}
```

---

Figure 1:
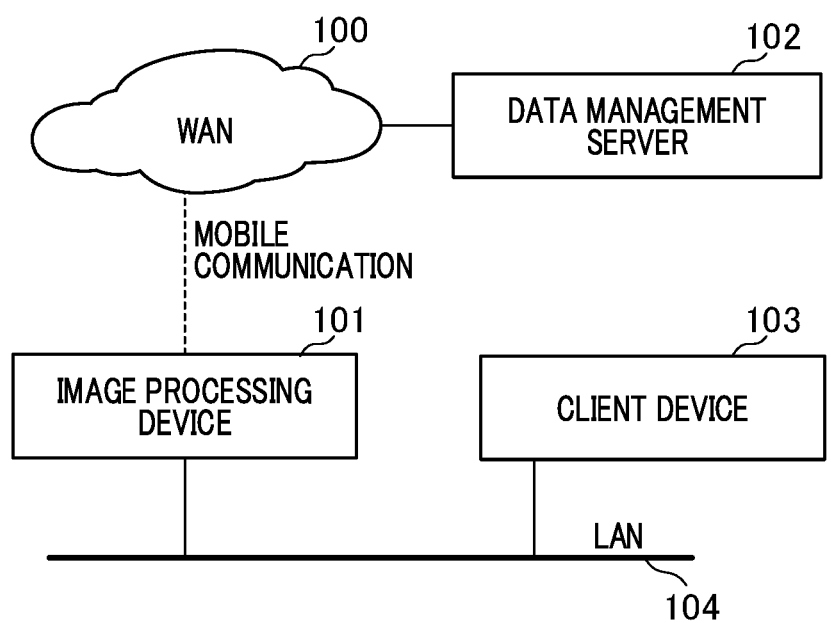
FIG. 1 is a diagram illustrating examples of a system configuration and a network configuration.

FIG. 1 is a diagram illustrating examples of a system configuration and a network configuration of the present embodiment.

An information processing system illustrated in FIG. 1 includes an image processing device 101, a client device 103, and a data management server 102.

The image processing device 101 is an example of a network device to which the present invention is applied. For example, the image processing device 101 is a printer, a scanner, or a multi-function peripheral. The image processing device 101 receives a request (for example, a printing request) from the client device 103 that is an external device via a LAN 104 and a network I/F 210 (FIG. 2B), and processes (executes) the request with a CPU 207 (FIG. 2B). A local area network (LAN) is an example of a local network. The single image processing device 101 may execute various processes.

The image processing device 101 has a mobile communication function. With respect to a specific event in the image processing device 101, the image processing device 101 may transmit information regarding the event to the data management server 102 via a WAN 100 by using mobile communication. WAN stands for wide area network. The specific event is at least one of an error and a component failure of which the occurrence has been detected inside the image processing device 101.

The client device 103 is an information processing device such as a personal computer (PC) operated by a user (customer). The data management server 102 is an example of a management server that acquires and manages information regarding an event in the image processing device 101. For example, the data management server 102 receives a fault notification from the image processing device 101, and returns a coping method corresponding to the type of fault that has occurred on the basis of fault coping information stored therein. The data management server 102 may provide a notification to a maintenance person through screen display or an email notification. The data management server 102 may predict a failure in the image processing device 101 by analyzing usage statuses for the fault notification that is received and stored, counter information, and the like. The data management server 102 may be implemented not only by a server device but also a virtual machine (cloud service) using resources provided by a data center, and may be implemented by an application. Different numbers of the image processing device 101 or the client device 103 from the numbers illustrated in FIG. 1 may be connected.

Figure 2A:
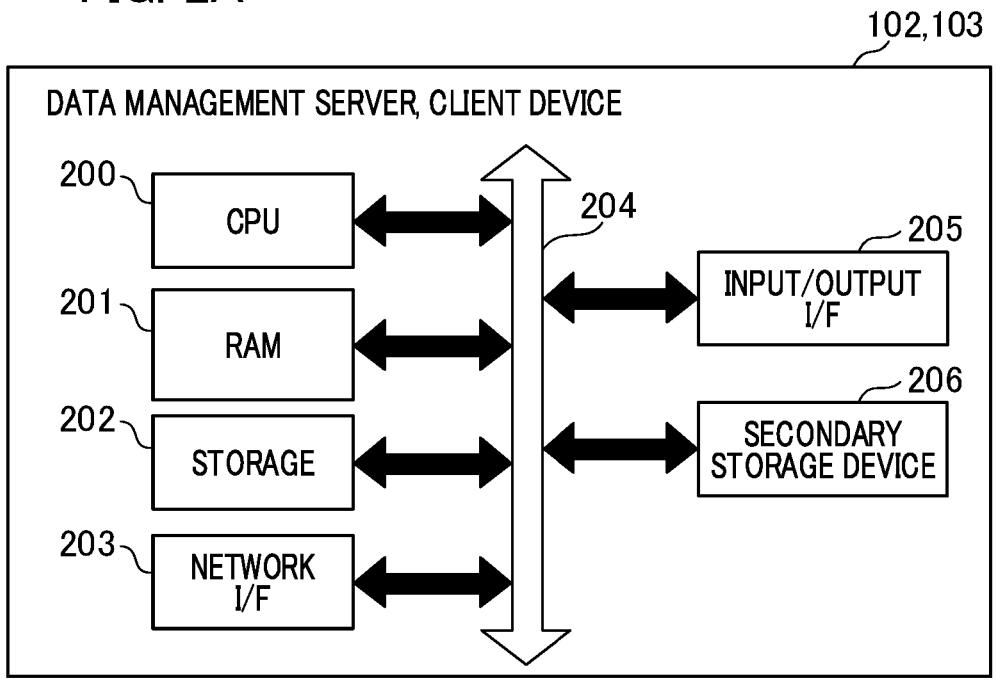
FIGS. 2A and 2B are hardware configuration diagrams of devices included in an information processing system.
Figure 2B:
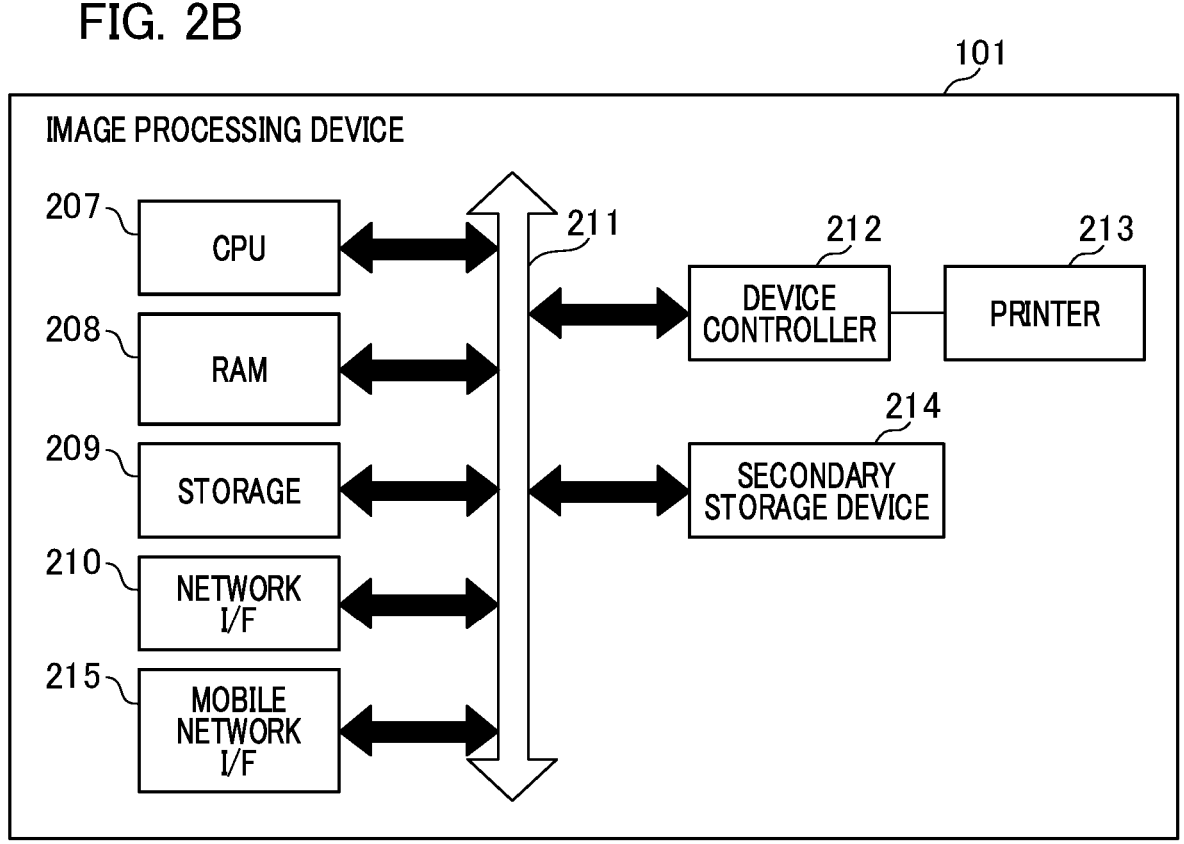

FIGS. 2A and 2B are hardware configuration diagrams of devices included in an information processing system of the present embodiment.

FIG. 2A illustrates an example of a hardware configuration of an information processing device that implements the data management server 102 or the client device 103. The information processing device illustrated in FIG. 2A includes a central processing unit (CPU) 200 connected to a secondary storage device 206. The CPU 200 controls the entire information processing device, and executes programs read from the random access memory (RAM) 201, the storage 202, the secondary storage device 206, and the like. The respective constituents included in the information processing device are connected to each other via the system bus 204, and, in the present embodiment, unless particularly mentioned, the system bus 204 is assumed to transfer control commands from the CPU 200 to the respective constituents connected to the system bus 204.

The RAM 201 is a storage unit configured to function as a temporary memory area. Embedded programs and data are recorded in the storage 202. The network interface (I/F) 203 connects the information processing device to a network, and performs communication with other computers or network devices. A communication method may be a wired or wireless method.

The input/output interface 205 inputs and outputs information and signals with hardware such as a display, a keyboard, a mouse, a touch panel, and buttons. A computer that does not have such hardware may also be connected and operated from another computer by using a remote desktop or a remote shell. The secondary storage device 206 is, for example, a hard disk drive (HDD) or a flash memory.

FIG. 2B illustrates an example of a hardware configuration of the image processing device 101. The image processing device 101 includes a CPU 207 to a mobile network I/F 215. The CPU 207 controls the entire image processing device 101, and executes programs read from the RAM 208, the storage 209, the secondary storage device 214, and the like. The RAM 208 is a storage unit configured to function as a temporary memory area. Embedded programs and data are recorded in the storage 209.

The mobile network I/F 215 is a network interface (first network interface) corresponding to a mobile network that realizes mobile communication. The mobile network is realized by a card (for example, a SIM card) having identification information for using the mobile network. Thus, the image processing device 101 has, for example, a card slot (not illustrated) into which the SIM card is inserted. The mobile network I/F 215 is connected to the network via the WAN 100 and performs mobile communication with other computers or network devices. A method of the mobile communication is a wireless method.

The network I/F 210 is a second network interface corresponding to communication different from the mobile communication. The network I/F 210 is connected to the network via the LAN 104 and performs communication with other computers or network devices. A communication method in the network I/F 210 may be a wired or wireless method.

The secondary storage device 214 is, for example, a hard disk drive (HDD) or a flash memory. The printer 213 executes a job such as printing. The device controller 212 receives a control command from the CPU 207 and controls the printer 213. The respective types of hardware included in the image processing device 101 are connected to each other via the system bus 211. In the present example, unless particularly mentioned, the system bus 211 is assumed to transfer control commands from the CPU 207 to the respective types of hardware connected to the system bus 211.

Figure 3:
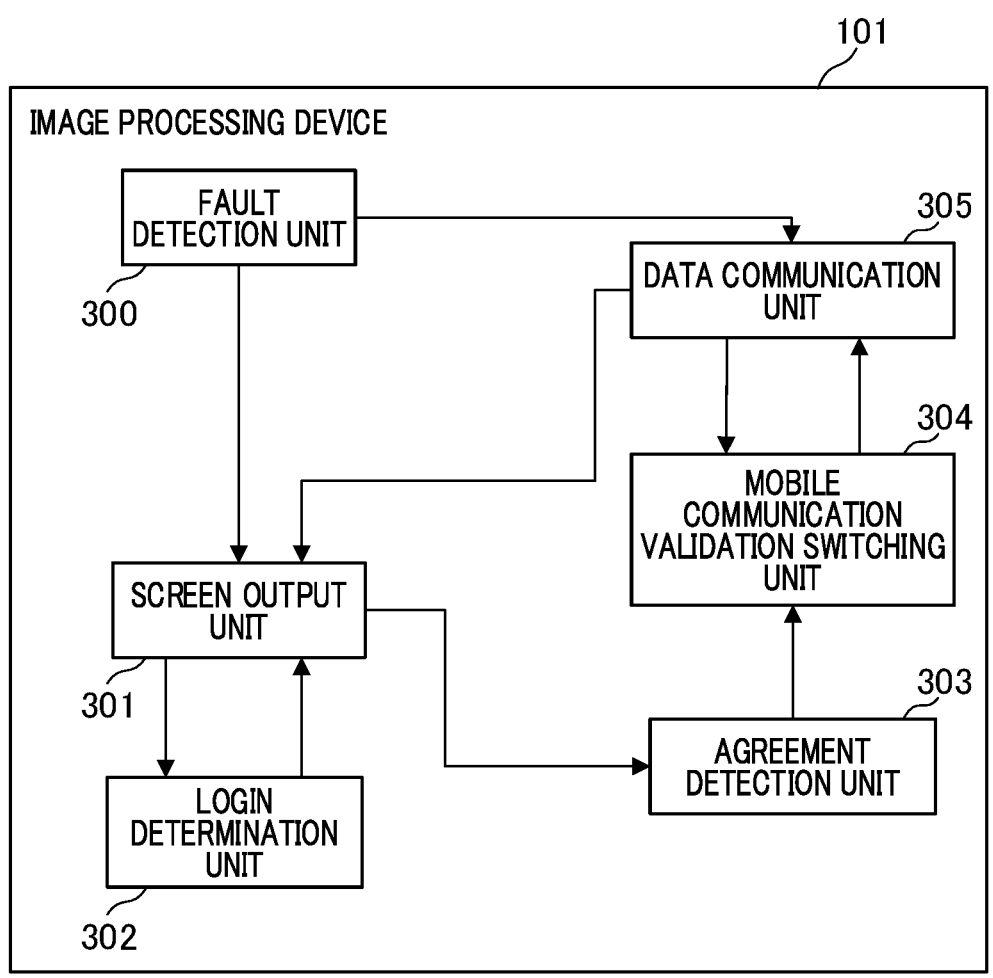
FIG. 3 illustrates an example of a functional block diagram of an image processing device of Example 1.

FIG. 3 illustrates an example of a functional block diagram of the image processing device of Example 1.

A program for realizing a function of the image processing device 101 is read from the RAM 208, the storage 209, the secondary storage device 214, or the like in FIG. 2B, and is executed by the CPU 207. Therefore, an operation of each constituent illustrated in FIG. 3 is executed under the control of the CPU 207. The image processing device 101 performs access to an external device via the WAN 100, such as access to the data management server 102, by using the mobile network I/F 215. The image processing device 101 performs access to an external device via the LAN 104, such as access to the client device 103, by using the network I/F 210.

The image processing device 101 has a fault detection unit 300, a screen output unit 301, a login determination unit 302, an agreement detection unit 303, a mobile communication validation switching unit 304, and a data communication unit 305.

The fault detection unit 300 detects a fault that has occurred in the image processing device 101 as an event in the image processing device 101. The screen output unit 301 outputs information indicating the occurrence of the event to a simple message display line (hereinafter, referred to as a "status line") that is a predetermined display region in a display screen of the image processing device 101. In this example, the screen output unit 301 displays the information indicating the occurrence of the fault (fault occurrence information) in the status line. An information output form in the screen output unit 301 is not limited to the form of outputting the information to the display screen of the image processing device 101. The screen output unit 301 may output the information to a display screen of the client device 103 via the LAN 104.

Figure 10A:
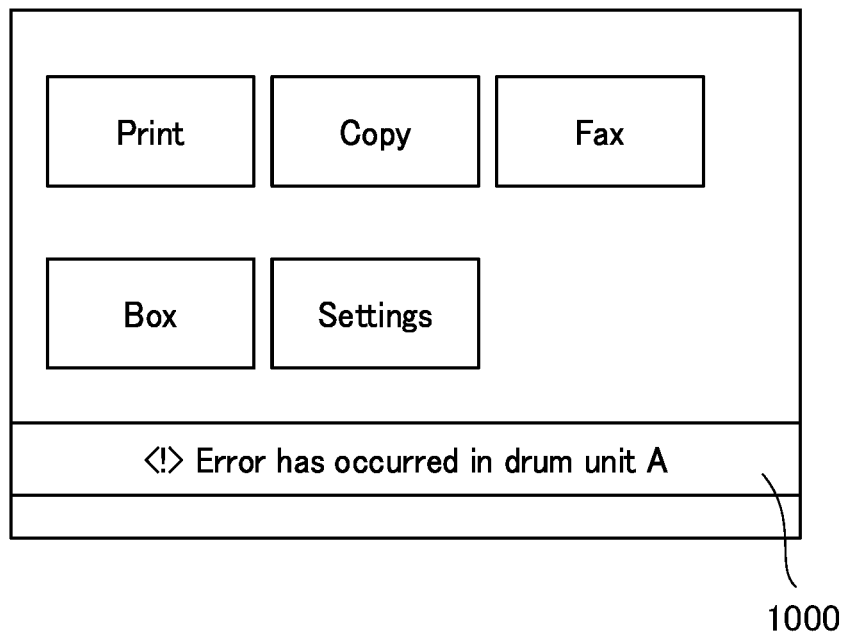

FIGS. 10A to 10E are diagrams illustrating examples of screens displayed on the image processing device. FIG. 10A illustrates an example in which fault occurrence information is displayed in a status line 1000. A user may press (select) the status line 1000 that functions as a user interface (UI).

FIG. 3 will now be referred to again. The login determination unit 302 determines whether or not the image processing device 101 is in a login state with administrator authority (administrator login state) if the status line 1000 is pressed. If the image processing device 101 is in the administrator login state, the CPU 207 controls the screen output unit 301 such that a check screen for checking approval or disapproval of transmitting (providing a notification of) fault information to the data management server 102 is displayed. The screen output unit 301 displays, as the check screen, a fault notification agreement screen including the fault information of which a notification is provided and a notification agreement button. The CPU 207 may print the fault information of which a notification is provided and display the agreement button on a screen.

Figure 10B:
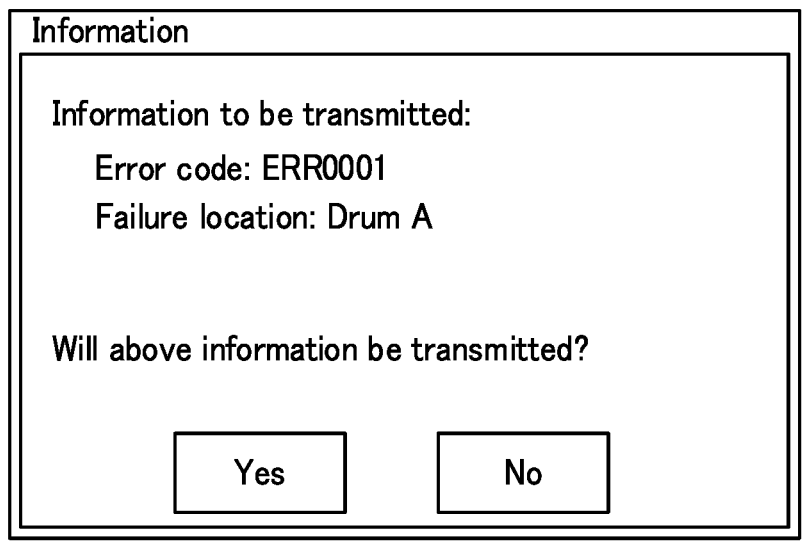

FIG. 10B illustrates an example of a fault notification agreement screen. If a user agrees with (approves of) a notification of the fault information, the user presses a "Yes" button. If the user does not agree with a notification of the fault information, the user presses a "No" button. The agreement detection unit 303 in FIG. 3 determines whether or not the user agrees with the notification of the fault information.

If the agreement detection unit 303 detects that the user agrees with the notification of the fault information, the mobile communication validation switching unit 304 validates mobile communication. When the mobile communication is validated, the CPU 207 may perform control such that access to a user information region such as an address book or scan data is restricted and only a region for device management such as fault occurrence information or usage status information can be accessed.

The data communication unit 305 notifies the data management server 102 of the fault information through the mobile communication (performs a fault notification). After the data communication unit 305 receives a response from the data management server 102, the mobile communication validation switching unit 304 invalidates the mobile communication without receiving an operation from the user. The screen output unit 301 displays a fault notification result screen. The fault notification result screen displays a fault information notification result. The screen output unit 301 may output the fault information notification result as a file such as CSV. The CPU 207 may print the fault information notification result.

Figure 4:
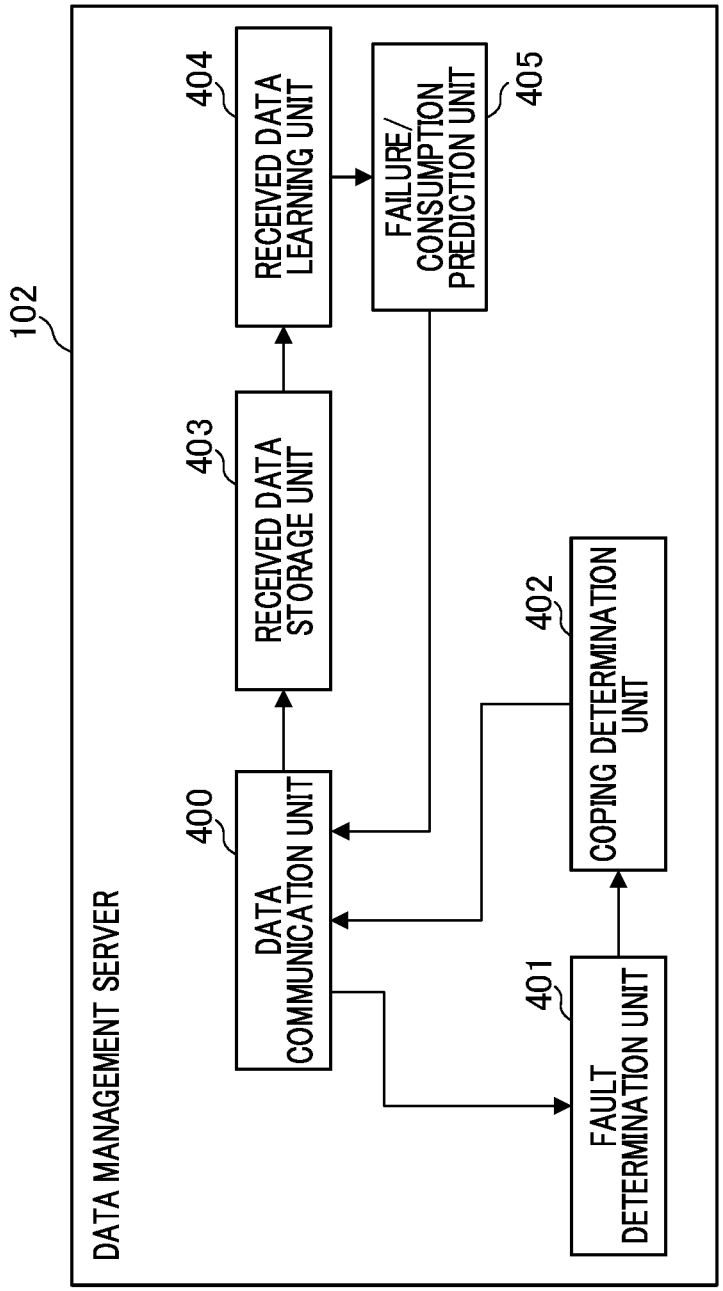
FIG. 4 illustrates an example of a functional block diagram of a data management server.

FIG. 4 illustrates an example of a functional block diagram of the data management server.

A program for realizing a function of the data management server 102 is read from the RAM 201, the storage 202, the secondary storage device 206, or the like, and is executed by the CPU 200 in FIG. 2A. Therefore, an operation of each constituent illustrated in FIG. 4 is executed under the control of the CPU 200. The data management server 102 performs access to an external device, such as access to the image processing device 101 by using the network I/F 203.

The data management server 102 has a data communication unit 400, a fault determination unit 401, a coping determination unit 402, a received data storage unit 403, a received data learning unit 404, and a failure/consumption prediction unit 405.

The data communication unit 400 receives the fault notification transmitted from the image processing device 101. The fault determination unit 401 determines the type of fault information indicated by the fault notification. The coping determination unit 402 determines coping with the type of fault determined by the fault determination unit 401. The data communication unit 400 notifies a maintenance person or a consumables seller of information indicating the coping with the fault determined by the fault determination unit 401.

The received data storage unit 403 stores received data (fault information or usage information) received by the data communication unit 400. The received data learning unit 404 learns the received data stored in the received data storage unit 403 to create a learned model. The failure/consumption prediction unit 405 executes failure/consumption prediction related to the image processing device 101 on the basis of the created learned model and the received data. A notification of a failure/consumption prediction result from the failure/consumption prediction unit 405 is provided to the image processing device 101, a maintenance person, or a consumables seller via the data communication unit 400.

Figure 5:
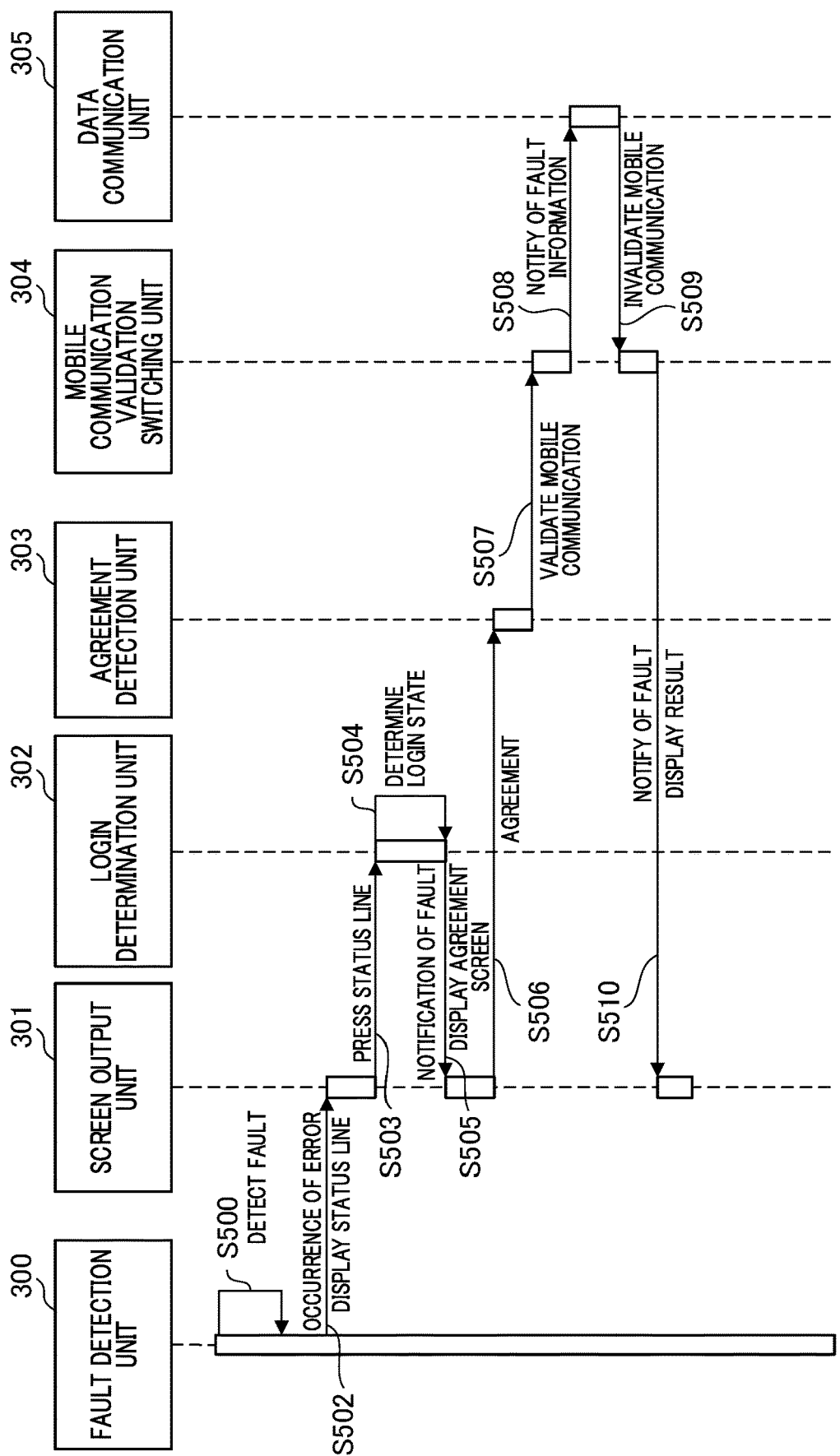
FIG. 5 is a diagram illustrating a fault notification process in the image processing device when a fault occurs.
Figure 6A:
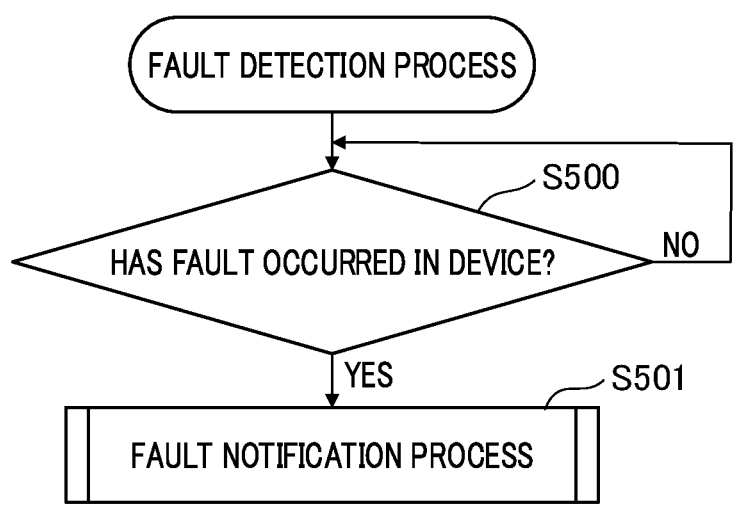
FIGS. 6A and 6B are flowcharts illustrating an example of the fault notification process.
Figure 6B:
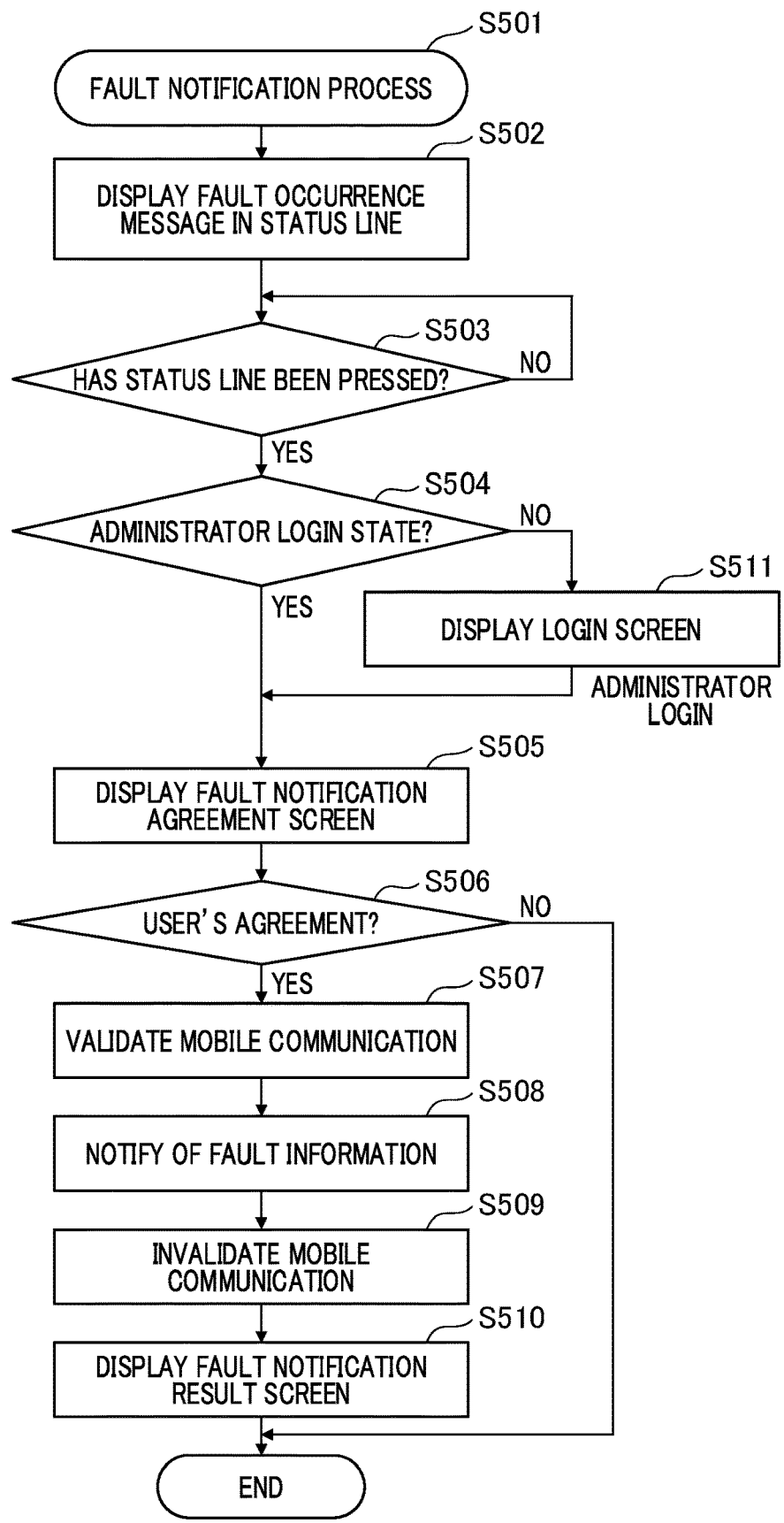

FIG. 5 is a diagram illustrating an example of a sequence of a fault notification process performed by the image processing device when a fault occurs in Example 1. FIGS. 6A and 6B are flowcharts illustrating an example of the fault notification process. In FIGS. 5 to 6B, a process with the same step number indicates the same process. A process when a fault occurs will be mainly described with reference to FIGS. 6A and 6B.

FIG. 6A illustrates an example of a fault detection process. In S500, the CPU 207 determines whether or not the occurrence of a fault in the image processing device 101 has been detected by the fault detection unit 300. If the occurrence of a fault has not been detected, the process returns to S500. If the occurrence of a fault has been detected, the process proceeds to S501. In S501, the CPU 207 performs the fault notification process.

FIG. 6B illustrates an example of the fault notification process. In S502, the screen output unit 301 displays fault occurrence information in the status line 1000 (FIG. 10A). In S503, the CPU 207 determines whether or not the status line 1000 has been pressed. If the status line 1000 has not been pressed, the process returns to S503. If the status line 1000 has been pressed, the process proceeds to S504.

Next, in S504, the login determination unit 302 determines whether or not the image processing device 101 is in an administrator login state. If the image processing device 101 is in an administrator login state, the process proceeds to S505. If the image processing device 101 is not in an administrator login state, the process proceeds to S511. In S511, the screen output unit 301 displays a login screen. When the image processing device 101 is brought into the administrator login state through a login operation using the login screen, the process proceeds to S511.

In S505, the CPU 207 controls the screen output unit 301 such that a fault notification agreement screen is displayed. The CPU 207 may print fault information of which a notification is provided and display an agreement button on a screen. Next, in S506, the CPU 207 determines whether or not the user's agreement with a fault notification has been detected by the agreement detection unit 303. If agreement with a fault notification has not been detected, a fault notification is not performed, and the process is finished. If agreement with a fault notification has been detected, the process proceeds to S507.

In S507, the mobile communication validation switching unit 304 validates mobile communication. When the mobile communication is validated, the CPU 207 may perform control such that access to a user information region such as an address book or scan data is prohibited and only a region for device management such as fault occurrence information or usage status information can be accessed.

Next, in S508, the data communication unit 305 transmits fault information to the data management server 102 (performs a fault notification). The data communication unit 305 receives a response to the fault notification from the data management server 102. Next, in S509, the mobile communication validation switching unit 304 invalidates the mobile communication. In S510, the screen output unit 301 displays a fault notification result screen.

FIG. 10C illustrates an example of the fault notification result screen. When the fault notification result screen is displayed, the screen output unit 301 may determine a method of coping with the fault that has occurred on the basis of information regarding fault coping stored in the storage 209 or the secondary storage device 214 of the image processing device 101, and display the coping method on a screen. The coping determination unit 402 of the data management server 102 may determine a fault coping method and notify the image processing device 101 thereof, and the screen output unit 301 may display the fault coping method of which a notification has been provided.

Example 2

When a fault occurs, the image processing device 101 of Example 2 checks a contract state for the image processing device 101 before a fault notification agreement screen is displayed, and changes a fault notification agreement screen to be displayed according to the checked contract state. If the contract state for the image processing device 101 indicates that a customer (user) of a service bears a communication usage fee, the image processing device 101 displays the same fault notification agreement screen as in Example 1. If the contract state for the image processing device 101 indicates that the customer does not bear the communication usage fee (no communication usage fee is incurred), the image processing device 101 displays a free fault notification agreement screen. The free fault notification agreement screen is a fault notification agreement screen including information indicating that no communication usage fee is incurred. The free fault notification agreement screen is displayed, and thus the customer's psychological resistance to the fault notification can be further reduced. The checked contract state for the image processing device 101 (device contract state) will be described below. If a value of CommunicationFee is Distributor, the image processing device 101 displays a free fault notification agreement screen.

| (Device contract state) |
|---|
| { |
| "ServiceConnection": True, |
| "CommunicationFee": "Distributor", |
| "ContractDate": "2020/4/1" |
| } |

Figure 7:
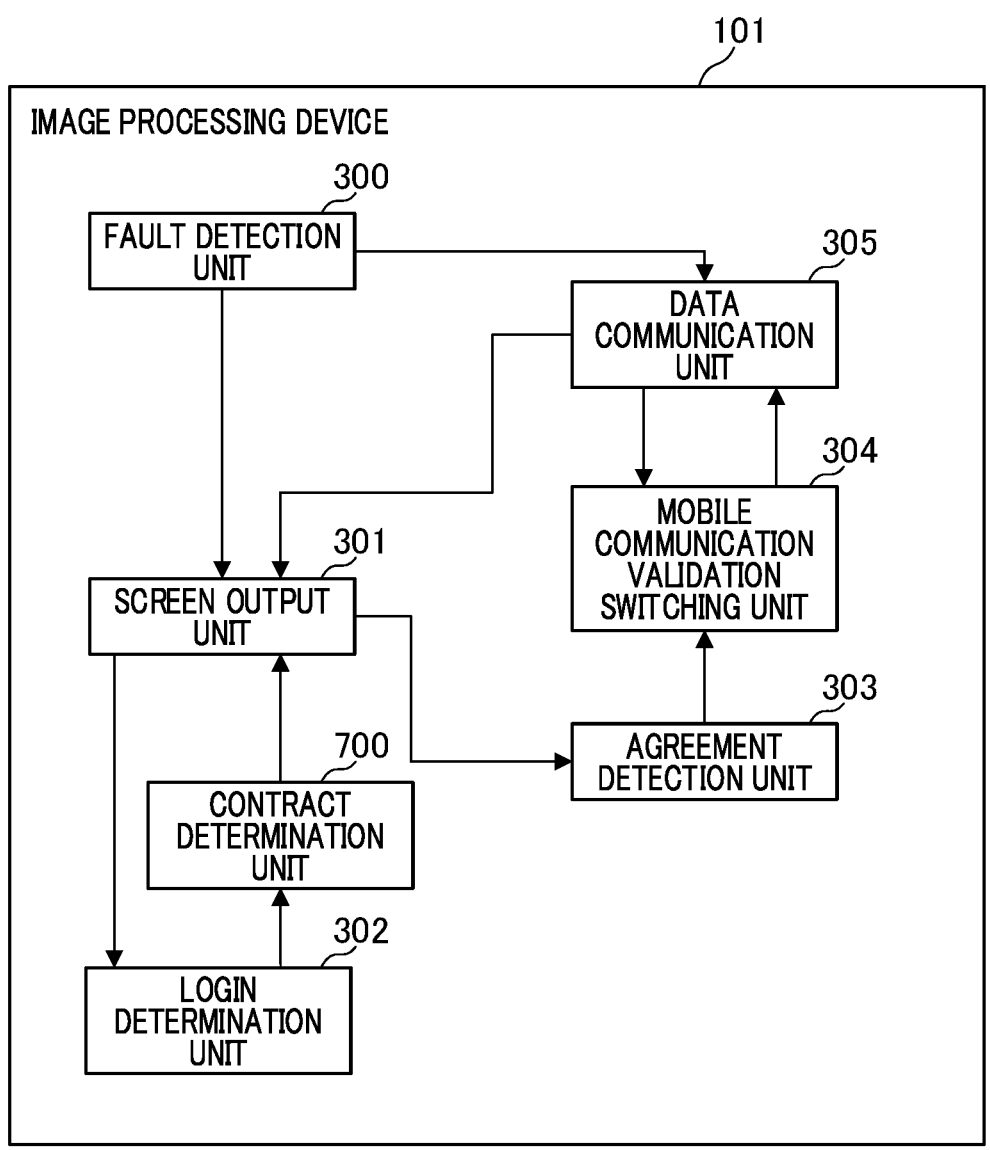
FIG. 7 illustrates a functional block diagram of an image processing device of Example 2.

FIG. 7 is a functional block diagram of the image processing device of Example 2.

A program for realizing a function of the image processing device 101 illustrated in FIG. 7 is read from the RAM 208, the storage 209, the secondary storage device 214, or the like in FIG. 2B, and is executed by the CPU 207. The image processing device 101 performs access to an external device via the WAN 100, such as access to the data management server 102, by using the mobile network I/F 215. The image processing device 101 performs access to an external device via the LAN 104, such as access to client device 103, by using the network I/F 210.

The image processing device 101 has a contract determination unit 700 in addition to the fault detection unit 300 to the data communication unit 305. The fault detection unit 300 to the data communication unit 305 are the same as the fault detection unit 300 to the data communication unit 305 described with reference to FIG. 3, and thus description thereof will not be repeated.

The contract determination unit 700 determines a contract state for the image processing device 101. When a contract for the image processing device 101 is a contract in which a customer bears a communication usage fee, the screen output unit 301 displays a normal fault notification agreement screen. If a contract for the image processing device 101 is not a contract in which a customer bears a communication usage fee, that is, a contract in which the communication usage fee is not incurred, the screen output unit 301 displays, for example, a free fault notification agreement screen illustrated in FIG. 10D.

Figure 8:
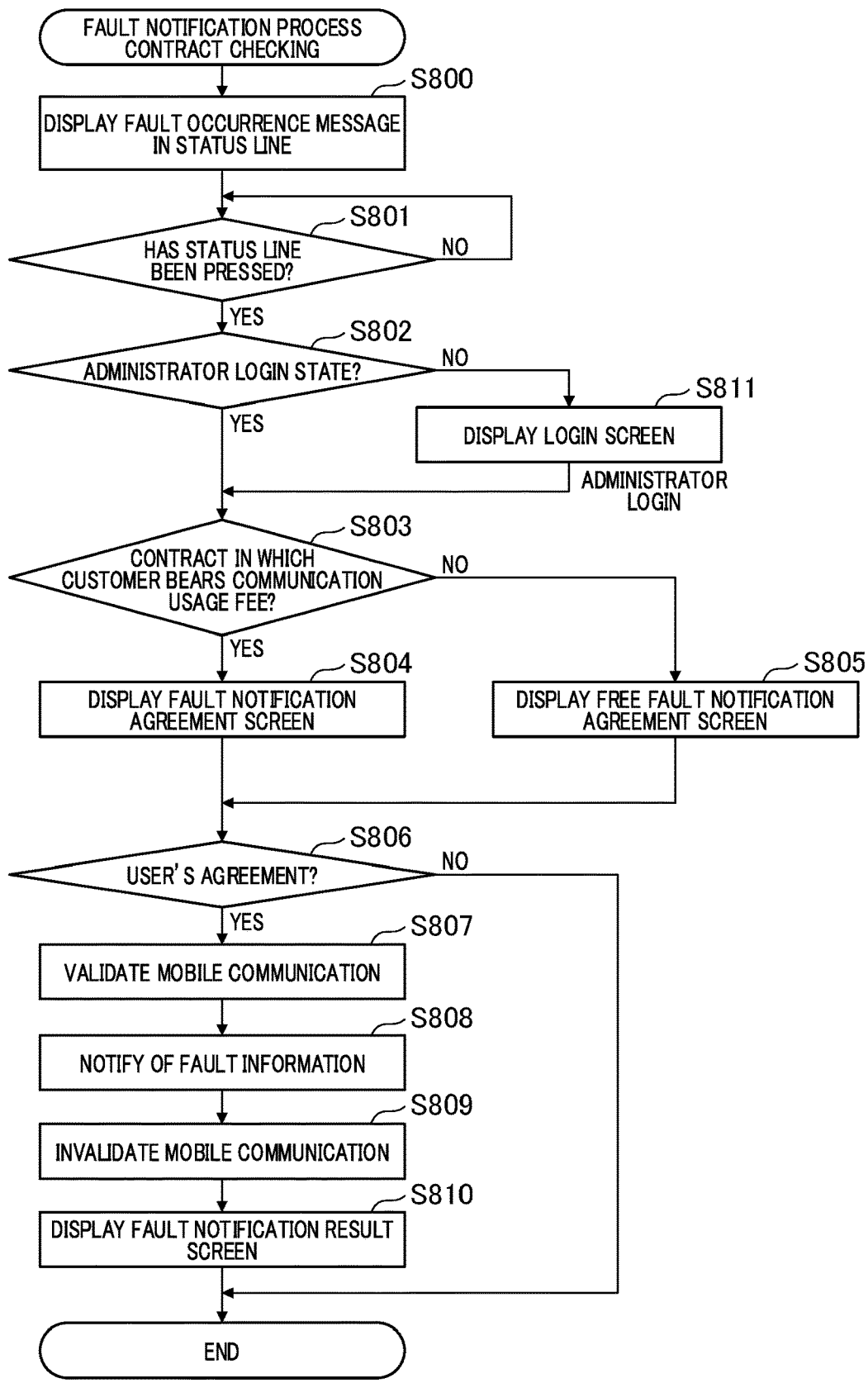
FIG. 8 is a flowchart illustrating a fault notification process in Example 2.

FIG. 8 is a flowchart illustrating a fault notification process performed by the image processing device when a fault occurs in Example 2.

S800 to S802 in FIG. 8 are the same as S502 to S504 in FIG. 6B. S806 to S811 in FIG. 8 are the same as S505 to S511 in FIG. 6B.

If the image processing device 101 is in an administrator login state in the determination process in S802 in FIG. 8, the process proceeds to S803. Next, in S803, the contract determination unit 700 determines a contract state for the image processing device 101. In this example, the contract determination unit 700 determines whether the contract for the image processing device 101 is a contract in which the customer bears a communication usage fee. If the contract for the image processing device 101 is a contract in which the customer bears a communication usage fee, the process proceeds to S804. In S804, the screen output unit 301 displays a normal fault notification agreement screen, that is the same fault notification agreement screen as the fault notification agreement screen displayed in S505 in FIG. 5. The process proceeds to S806. If the contract for the image processing device 101 is not a contract in which the customer bears a communication usage fee, the process proceeds to S805. In S805, the screen output unit 301 displays a free fault notification agreement screen. The process proceeds to S806.

Example 3

When a user approves the image processing device 101 of Example 3 to perform transmission (anytime transmission) of fault information to the data management server 102 at any time (anytime fault notification), the subsequent fault notification can be performed without displaying a fault notification agreement screen. A configuration of the image processing device of Example 3 is the same as the configuration of the image processing device 101 of Example 1 or Example 2.

The image processing device 101 of Example 3 determines, for example, whether a device contract state for the image processing device 101 is a contract in which communication is permitted at any time (hereinafter, described as "anytime connection contract") at the time of startup.

An example of a device contract state stored in the storage 209 or the secondary storage device 214 of the image processing device 101 will be described below. If a value of ConnectionType is Anytime, the image processing device 101 determines that a device contract state is an anytime connection contract.

| (Device contract state) |
|---|
| {<br>"ServiceConnection": True,<br>"ConnectionType": "Anytime",<br>    "ContractDate": "2020/4/1"<br>} |

If the device contract state is an anytime connection contract, the image processing device 101 displays an anytime fault notification agreement screen. The anytime fault notification agreement screen is a screen for checking approval or disapproval of an anytime fault notification. FIG. 10E illustrates an example of the anytime fault notification agreement screen. If a user agrees with (approves of) an anytime fault notification through an operation on the anytime fault notification agreement screen, the image processing device 101 stores agreement information in the storage 209 or the secondary storage device 214, and validates mobile communication. The agreement information indicates whether or not agreement with the anytime fault notification has been completed (approval thereof has been completed).

When an event occurs in the image processing device 101 (for example, when a fault occurs), if agreement with an anytime fault notification has been completed, the image processing device 101 performs a fault notification without displaying a fault notification agreement screen, that is, without checking approval or disapproval of a fault notification. The image processing device 101 of Example 3 can validate mobile communication according to agreement with an anytime fault notification and perform a fault notification without a user giving agreement every time a fault occurs.

Figure 9A:
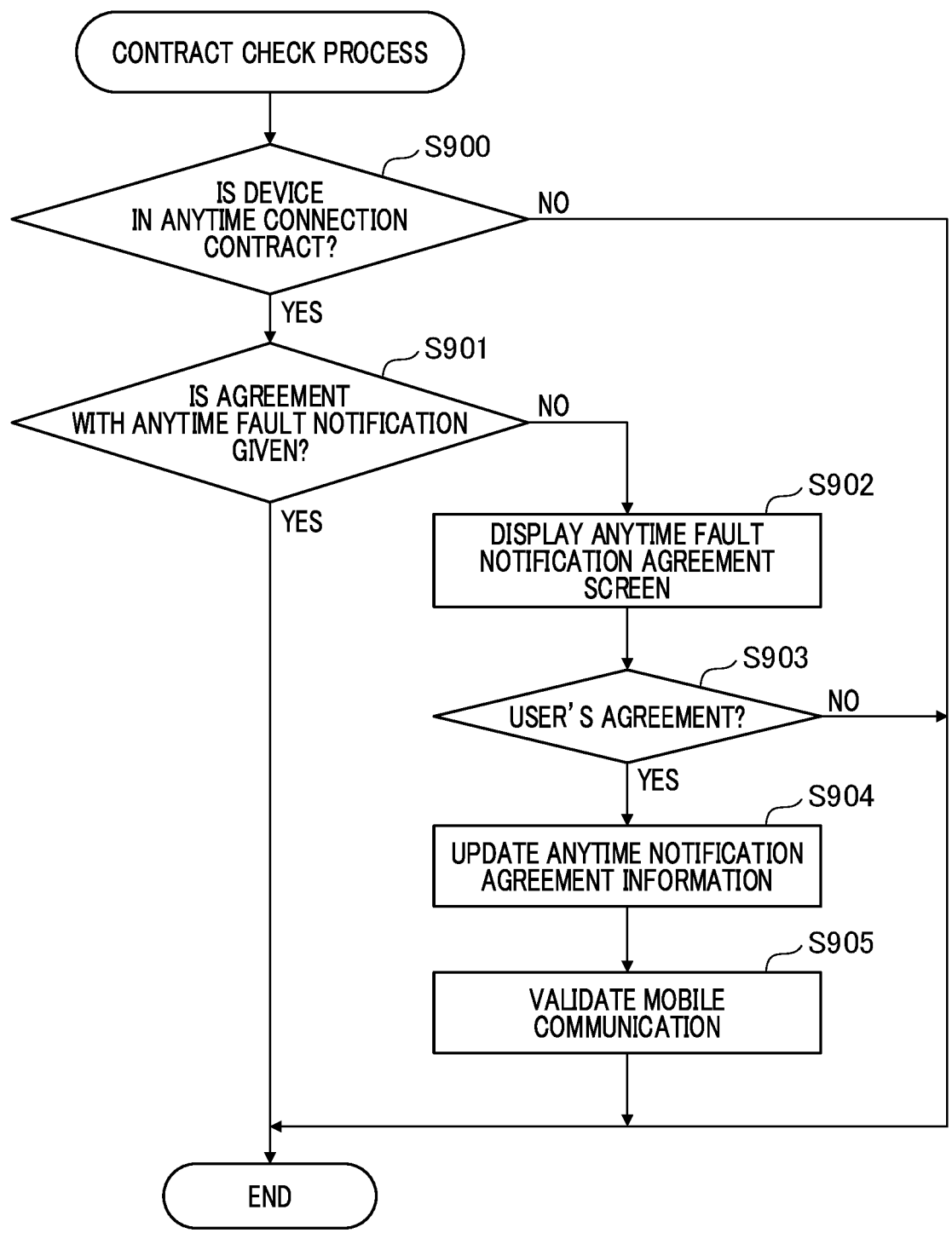
FIGS. 9A and 9B are flowcharts illustrating a fault notification process in Example 3.
Figure 9B:
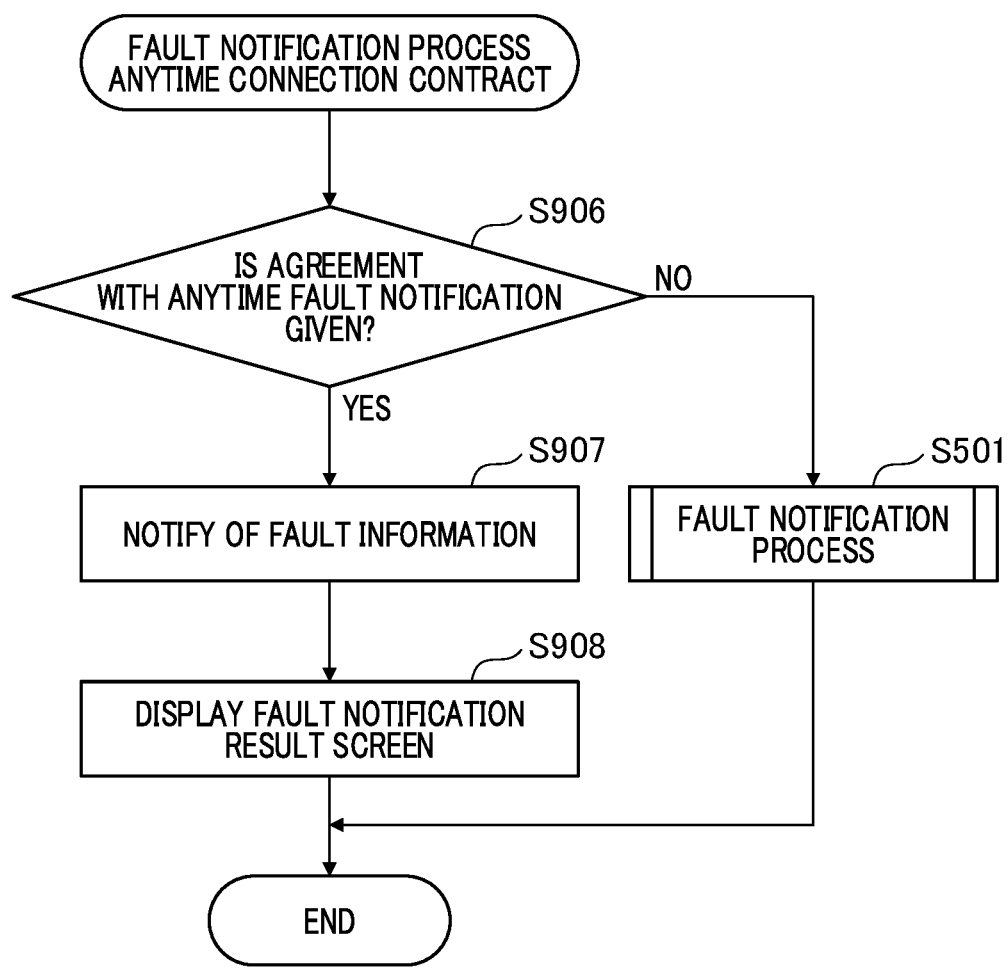

FIGS. 9A and 9B are flowcharts illustrating a fault notification process performed by the image processing device when a fault occurs in Example 3.

FIG. 9A illustrates an example of a contract checking process in the image processing device 101. First, in S900, at the time of startup of the image processing device 101, the CPU 207 controls the contract determination unit 700 (FIG. 7) such that it is determined whether or not the image processing device 101 is in an anytime connection contract. If the image processing device 101 is not in an anytime connection contract, the process is finished. If the image processing device 101 is in an anytime connection contract, the process proceeds to S901.

In S901, the CPU 207 determines whether or not agreement with an anytime fault notification has been detected by the agreement detection unit 303. If agreement with an anytime fault notification has been detected, the process is finished. If agreement with an anytime fault notification has not been detected, the process proceeds to S902.

Next, in S902, the screen output unit 301 displays an anytime fault notification agreement screen. Next, in S903, the CPU 207 determines whether or not the user agrees with the anytime fault notification. If the user does not agree with the anytime fault notification, the process is finished. If the user agrees with the anytime fault notification, the process proceeds to S904.

In S904, the CPU 207 updates anytime fault notification agreement information. The anytime fault notification agreement information indicates that the user agrees with the anytime fault notification. After the process in S904, the process proceeds to S905. In S905, the mobile communication validation switching unit 304 validates mobile communication, and finishes the process.

FIG. 9B illustrates an example of a fault notification process when a fault occurs. In S906, the CPU 207 determines whether or not the user agrees with the anytime fault notification. If the user does not agree with the anytime fault notification, the process proceeds to S501. In S501, the CPU 207 executes the same fault notification process as the fault notification process described with reference to FIG. 6B.

If the user agrees with the anytime fault notification, the process proceeds to S907. In S907, the data communication unit 305 notifies the data management server 102 of fault information. In S908, the screen output unit 301 displays a fault notification result screen. When the fault notification result screen is displayed, the screen output unit 301 may determine a method of coping with the fault that has occurred on the basis of information regarding fault coping stored in the storage 209 or the secondary storage device 214 of the image processing device 101, and display the coping method on a screen. The coping determination unit 402 of the data management server 102 may determine a fault coping method and notify the image processing device 101 thereof, and the screen output unit 301 may display the fault coping method of which a notification has been provided. As described above, the preferred embodiment of the present invention has been described, but the present invention is not limited to the embodiment, and various modifications and changes may occur within the scope of the sprit thereof.

Other Embodiments

Embodiment(s) of the present invention can also be realized by a computer of a system or device that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or device by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-167356, filed Oct. 1, 2020, which is hereby incorporated by reference herein in its entirety.

What is claimed is:

1. A network device comprising:
a first network interface corresponding to mobile communication;
a second network interface corresponding to communication different from the mobile communication;
at least one memory storing instructions; and
one or more processors configured to execute the instructions, which when executed by the one or more processors, cause the network device to:
output information indicating occurrence of a specific event in the network device to a predetermined display region;
check approval or disapproval of transmission of information regarding the specific event to a management server in accordance with selection of the predetermined display region;
enable mobile communication if transmission of the information regarding the specific event to the management server is approved;
transmit, using the first network interface, the information regarding the specific event to the management server through the enabled mobile communication; and
disable the enabled mobile communication but not the communication by the second network interface, based on a response received from the management server after the information regarding the specific event is transmitted to the management server through the enabled mobile communication,
wherein the mobile communication enables communication between the network device and the management server via a WAN, and
wherein, if the mobile communication is not enabled, the network device does not connect to the WAN.

2. The network device according to claim 1, wherein the instructions cause the network device to receive a request from an external device connected to a local network by using the second network interface and to process the request.

3. The network device according to claim 1, wherein the instructions cause the network device to:
determine whether or not the network device is in a login state with administrator authority in accordance with selection of the predetermined display region; and
check approval or disapproval of transmission of the information regarding the specific event to the management server if it is determined that the network device is in a login state with administrator authority.

4. The network device according to claim 1, wherein the instructions cause the network device to display a check screen for checking approval or disapproval of transmission of the information regarding the specific event to the management server.

5. The network device according to claim 4, wherein the instructions cause the network device to change the check screen to be displayed according to a contract state for the network device.

6. The network device according to claim 5, wherein the instructions cause the network device to, if a contract for the network device is a contract in which a communication usage fee is not incurred, display the check screen including information indicating that the communication usage fee is not incurred.

7. The network device according to claim 1, wherein the mobile communication is realized by a card including identification information for using a mobile network.

8. The network device according to claim 1, wherein the instructions cause the network device to execute control such that only a device management region is accessible if the mobile communication is enabled.

9. The network device according to claim 1, wherein the instructions cause the network device to:
check approval or disapproval of anytime transmission of the information regarding the specific event to the management server;
enable the mobile communication if anytime transmission of the information regarding the specific event to the management server is approved; and
if approval of anytime transmission of the information regarding the specific event to the management server has been completed when the specific event occurs in the network device, transmit the information regarding the specific event to the management server without checking approval or disapproval of transmission of the information regarding the specific event.

10. The network device according to claim 1, wherein the specific event is at least one of an error of which occurrence has been detected inside the network device and a component failure.

11. The network device according to claim 1, wherein the network device is a printer, a scanner, or a multi-function peripheral.

12. A method comprising:
enabling a first network interface corresponding to mobile communication;
enabling a second network interface corresponding to communication different from the mobile communication;
outputting information indicating occurrence of a specific event in a network device to a predetermined display region;
checking approval or disapproval of transmission of information regarding the specific event to a management server in accordance with selection of the predetermined display region;
enabling mobile communication if transmission of the information regarding the specific event to the management server is approved;
transmitting, using the first network interface corresponding to the mobile communication, the information regarding the specific event to the management server through the enabled mobile communication; and
disabling the enabled mobile communication but not communication by the second network interface, based on a response received from the management server after the information regarding the specific event is transmitted to the management server through the enabled mobile communication,
wherein the mobile communication enables communication between the network device and the management server via a WAN, and
wherein, if the mobile communication is not enabled, the network device does not connect to the WAN.

13. A non-transitory storage medium on which is stored a computer program for making a computer of a network device perform operations comprising:
- enabling a first network interface corresponding to mobile communication;
- enabling a second network interface corresponding to communication different from the mobile communication;
- outputting information indicating occurrence of a specific event in a network device to a predetermined display region;
- checking approval or disapproval of transmission of information regarding the specific event to a management server in accordance with selection of the predetermined display region;
- enabling mobile communication if transmission of the information regarding the specific event to the management server is approved;
- transmitting, using the first network interace, the information regarding the specific event to the management server through the enabled mobile communication; and
- disabling the enabled mobile communication but not the communication by the second network interface, based on a response received from the management server after the information regarding the specific event is transmitted to the management server through the enabled mobile communication,
- wherein the mobile communication enables communication between the network device and the management server via a WAN, and
- wherein, if the mobile communication is not enabled, the network device does not connect to the WAN.

* * * * *